United States Patent
Kamihara et al.

(10) Patent No.: US 9,108,743 B2
(45) Date of Patent: Aug. 18, 2015

(54) CAP, FASTENING STRUCTURE USING THE SAME, AND AIRCRAFT INCLUDING THE FASTENING STRUCTURE

(75) Inventors: Nobuyuki Kamihara, Tokyo (JP); Koichi Murakami, Tokyo (JP); Kazuo Yamamoto, Kobe (JP)

(73) Assignees: MITSUBISHI HEAVY INDUSTRIES, LTD., Tokyo (JP); KAZUO YAMAMOTO, Hyogo (JP)

( * ) Notice: Subject to any disclaimer, the term of this patent is extended or adjusted under 35 U.S.C. 154(b) by 188 days.

(21) Appl. No.: 13/583,332

(22) PCT Filed: Mar. 22, 2011

(86) PCT No.: PCT/JP2011/056744
§ 371 (c)(1),
(2), (4) Date: Sep. 7, 2012

(87) PCT Pub. No.: WO2011/118558
PCT Pub. Date: Sep. 29, 2011

(65) Prior Publication Data
US 2013/0043351 A1 Feb. 21, 2013

(30) Foreign Application Priority Data
Mar. 23, 2010 (JP) .................................. 2010-066927

(51) Int. Cl.
*B64D 45/02* (2006.01)
*F16B 37/14* (2006.01)

(52) U.S. Cl.
CPC ................ *B64D 45/02* (2013.01); *F16B 37/14* (2013.01)

(58) Field of Classification Search
CPC ............ B64D 45/02; B64C 1/12; F16B 37/14
USPC .................. 244/131, 132, 1 A; 411/429, 431, 411/372.5–374, 377
See application file for complete search history.

(56) References Cited

U.S. PATENT DOCUMENTS 4,041,833 A * 8/1977 Wagner ...................... 411/372.6
4,382,049 A 5/1983 Hofmeister et al.
(Continued)

FOREIGN PATENT DOCUMENTS

JP 62-168394 7/1987
JP 2-7398 1/1990
(Continued)

OTHER PUBLICATIONS

Office Action issued Oct. 9, 2013 in corresponding Russian Application No. 2012138584, with English translation.
(Continued)

*Primary Examiner* — Philip J Bonzell
*Assistant Examiner* — Nicholas McFall
(74) *Attorney, Agent, or Firm* — Wenderoth, Lind & Ponack, L.L.P.

(57) ABSTRACT

A cap capable of achieving enhanced safety by inhibiting the occurrence of sparks thereinside even if a lightning current has flowed through a fastener, a fastening structure using the same, and an aircraft including the fastening structure. The cap (27) is attached so as to cover a portion of a fastener (15) that couples an upper skin (3) of an aircraft and a stringer (11) located inside the upper skin. The covered portion projects through the stringer (11). An outer surface (33) of the cap that comes into contact with an interior space of the upper skin (3) is a curved surface, and the cap is made of a conductive material.

15 Claims, 2 Drawing Sheets

(56) References Cited

U.S. PATENT DOCUMENTS

| | | | |
|---|---|---|---|
| 4,905,931 | A | 3/1990 | Covey |
| 5,314,144 | A | 5/1994 | Porter, Jr. et al. |
| 5,709,356 | A | 1/1998 | Avenet et al. |
| 6,086,972 | A * | 7/2000 | Rayburn et al. ............. 428/40.1 |
| 6,347,916 | B1 * | 2/2002 | Ramirez .................... 411/372.5 |
| 6,902,316 | B1 * | 6/2005 | Pierce et al. ...................... 374/7 |
| 2005/0103936 | A1 * | 5/2005 | Pridham et al. ............... 244/119 |
| 2009/0028660 | A1 | 1/2009 | Csik et al. |
| 2009/0245968 | A1 | 10/2009 | Cavailles |
| 2010/0224724 | A1 | 9/2010 | Kamino et al. |

FOREIGN PATENT DOCUMENTS

| | | |
|---|---|---|
| JP | 5-215108 | 8/1993 |
| JP | 2007-126119 | 5/2007 |
| JP | 2009-531630 | 9/2009 |
| JP | 2009-227166 | 10/2009 |
| RU | 2 263 581 | 11/2005 |

OTHER PUBLICATIONS

Notice of Allowance issued Oct. 2, 2013 in corresponding Canadian Patent Application No. 2,792,105.

International Search Report issued Jun. 21, 2011 in corresponding International Application No. PCT/JP2011/056744.

Notification of Reasons for Rejection issued Feb. 4, 2014 in corresponding Japanese Application No. 2010-066927 (with English translation).

Decision on patent grant for Invention issued Feb. 24, 2014 in corresponding Russian Application No. 2012138584/11 (with English translation).

* cited by examiner

CAP, FASTENING STRUCTURE USING THE SAME, AND AIRCRAFT INCLUDING THE FASTENING STRUCTURE

BACKGROUND OF THE INVENTION

1. Technical Field

The present invention relates to a cap, a fastening structure using the same, and an aircraft including the fastening structure.

2. Description of the Related Art

A skin constituting the body of an aircraft is reinforced from inside with a structural member that is a frame member formed in a grid configuration.

The skin and the structural member located inside the skin are bonded with a fastener. Since the fastener is made of a metal (for example, a titanium alloy), there is the possibility that a bolt of lightning strike may pass through the fastener and generate sparks internally.

For this reason, a structure for inhibiting a bolt of lightning from passing though the fastener has been proposed, for example, as disclosed in Japanese Unexamined Patent Application, Publication No. 2007-126119.

In the structure disclosed in JP 20007-126119, an insulating cap is mounted at the outer end of the head of a fastener, and many structures have been proposed that inhibit the passage of a bolt of lightning by devising the structure of the fastener in this way.

SUMMARY OF THE INVENTION

1. Technical Problem

With the conventional structures in which a skin and a structural member are coupled with a fastener, a corner is present at a portion of the fastener that projects from the structural member. Therefore, when a current flows through the fastener, the electric field tends to be concentrated at the corner. In the case where an aircraft has been struck by lightning, once current flows through the fastener, electric field concentration occurs at the corner even if inhibiting measures have been taken, and thus sparks tend to occur. For example, when sparks occur in a fuel tank containing a combustible such as a fuel, there is the possibility of an explosion due to ignition of the fuel.

In view of such circumstances, it is an object of the present invention to provide a cap capable of achieving enhanced safety by inhibiting the occurrence of sparks thereinside even if a lightning current has flowed through a fastener, a fastening structure using the same, and an aircraft including the fastening structure.

2. Solution to the Problem

In order to solve the above-described problem, the present invention adopts the following arrangement.

That is, a first aspect of the present invention is a cap that is attached so as to cover a portion of a fastener that couples a skin of an aircraft and a structural member located inside the skin, the portion projecting through the structural member, wherein an outer surface of the cap that comes into contact with an interior space of the skin is a curved surface, and the cap is made of a conductive material.

The cap according to the first aspect of the present invention is made of a conductive material and is attached so as to cover a portion of a fastener that couples a skin of an aircraft and a structural member located inside the skin, the portion projecting through the structural member. Therefore, the stroke current passing through the fastener flows through the interior of the cap. This makes it possible to inhibit concentration of the electric field at a corner of the fastener that is located at the above-described portion.

Since the outer surface of the cap that comes into contact with the interior space of the skin, for example, the surface exposed inside a tank is a curved surface; there is no corner on the outer surface of the cap that comes into contact with the interior space of the skin. Accordingly, a portion where the electric field is concentrated is not present on the outer surface of the cap, and it is therefore possible to inhibit the occurrence of sparks caused by electric field concentration.

For example, the use of this cap for a fuel tank containing a combustible such as fuel can suppress the possibility of explosion due to ignition of the fuel caused by the occurrence of sparks, and it is therefore possible to achieve enhanced safety.

In the above-described first aspect, it is preferable that the cap includes a contact surface coming into contact with the structural member.

This allows the current flowing from the fastener to the cap to flow through the contact surface to the structural member, and, therefore, the resistance of the current flowing from the fastener to the structural member is effectively lowered. When the resistance of the current flowing from the fastener to the structural member is lowered, the current value is decreased, and it is therefore possible to further inhibit the occurrence of sparks.

The contact surface is in contact with the structural member and thus does not correspond to the outer surface coming into contact with the interior space of the skin, and, therefore, a corner may be present.

A second aspect of the present invention is a cap that is attached so as to cover a portion of a fastener that couples a skin of an aircraft and a structural member located inside the skin, the portion projecting through the structural member, wherein the cap includes a contact surface coming into contact with the structural member and is made of a conductive material.

The cap according to the second aspect of the present invention is made of a conductive material and is attached to so as to cover a portion of a fastener that couples a skin of an aircraft and a structural member located inside the skin, the portion projecting through the structural member. Therefore, the stroke current passing through the fastener flows through the interior of the cap. This makes it possible to inhibit concentration of the electric field at a corner of the fastener that is located at the above-described portion.

Furthermore, since the current flowing from the fastener to the cap flows through the contact surface to the structural member, the resistance of the current flowing from the fastener to the structural member is effectively lowered. When the resistance of the current flowing from the fastener to the structural member is lowered, the current value is decreased, and it is therefore possible to further inhibit the occurrence of sparks.

For example, the use of this cap for a fuel tank containing a combustible such as a fuel inside can suppress the possibility of explosion due to ignition of the fuel caused by the occurrence of sparks, and it is therefore possible to achieve enhanced safety.

The contact surface is in contact with the structural member and thus does not correspond to the outer surface coming into contact with the interior space of the skin, and, therefore, a corner may be present.

A third aspect of the present invention is a fastening structure in which a skin of an aircraft and a structural member located inside the skin are coupled by a fastener, wherein a portion of the fastener that projects through the structural member is covered by the cap according to the first or the second aspect.

With the fastening structure according to the third aspect of the present invention, the portion of the fastener that projects through the structural member is covered by the cap according to the first or the second aspect, and it is therefore possible to inhibit the occurrence of sparks even if a stroke current flows through the fastener.

For example, the use of this fastening structure as a fastening structure for a fuel tank can suppress the possibility of explosion due to ignition of the fuel caused by the occurrence of sparks, and it is therefore possible to achieve enhanced safety.

A fourth aspect of the present invention is an aircraft in which a skin and a structural member located inside the skin are at least partly fastened by the fastening structure according to the third aspect.

With the aircraft according to the fourth aspect of the present invention, a skin and a structural member located inside the skin are at least partly fastened by the fastening structure capable of inhibiting the occurrence of sparks. Therefore, for example, the use of this fastening structure as a fastening structure for a fuel tank containing a combustible such as a fuel inside can suppress the possibility of explosion due to ignition of the fuel caused by the occurrence of sparks, and it is therefore possible to achieve enhanced safety.

3. Advantageous Effects of the Invention

According to the present invention, the cap is made of a conductive material and is attached so as to cover a portion of a fastener that couples a skin of an aircraft and a structural member located inside the skin, the portion projecting through the structural member. Therefore, the stroke current passing through the fastener flows through the interior of the cap. This makes it possible to inhibit concentration of the electric field at a corner of the fastener that is located at the above-described portion.

The outer surface of the cap that comes into contact with the interior space of the skin, for example, the surface exposed inside a tank is a curved surface, and/or the cap includes a contact surface coming into contact with the structural member, and it is therefore possible to inhibit the occurrence of sparks caused by electric field concentration.

For example, the use of this cap for a fuel tank containing a combustible can suppress the possibility of explosion due to ignition of the fuel caused by the occurrence of sparks, and it is therefore possible to achieve enhanced safety.

DETAILED DESCRIPTION OF THE INVENTION

Hereinafter, a fastening structure according to one embodiment of the present invention will be described in detail with reference to FIGS. 1 to 3.

Figure 1:
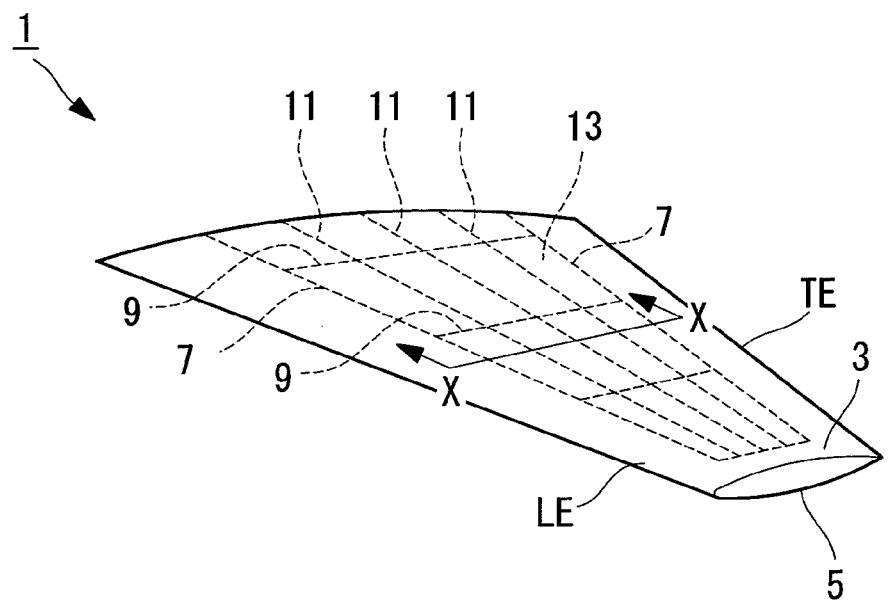
FIG. 1 is a perspective view illustrating the configuration of a main wing provided with a fuel tank using a fastening structure according to one embodiment of the present invention.

FIG. 1 is a perspective view illustrating the configuration of a main wing provided with a fuel tank using a fastening structure according to the present embodiment. FIG. 2 is a cross-sectional view illustrating the configuration of the fuel tank shown in FIG. 1 taken along the arrows X-X.

Figure 2:
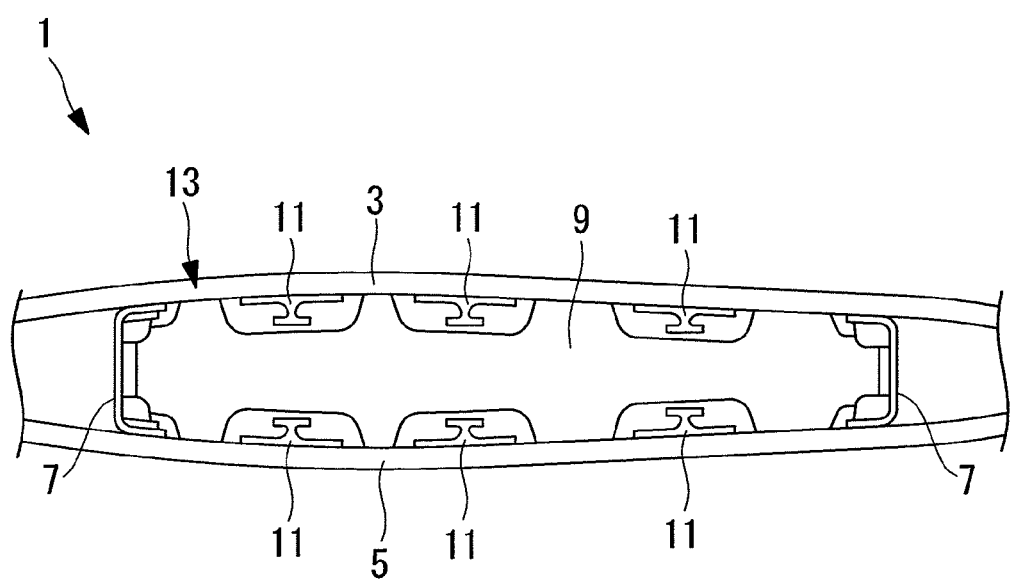
FIG. 2 is a cross-sectional view illustrating the configuration of the fuel tank shown in FIG. 1 taken along the arrow X-X.

As shown in FIGS. 1 and 2, a main wing 1 is provided mainly with an upper skin (skin) 3, a lower skin (skin) 5, spars (structural members) 7, ribs (structural members) 9, and stringers (structural members) 11.

Furthermore, a fuel tank 13 is provided integrally with the main wing 1 in the interior, or in other words, the interior space of the main wing 1.

The upper skin 3 and the lower skin 5 are thin plates forming the outer shape of the main wing 1, and serve to bear a part of tensile load and compressive load that act on the main wing 1, together with the spars 7, the ribs 9, and the stringers 11.

The upper skin 3 is a thin plate constituting the upper face of the main wing 1, and the lower skin 5 is a thin plate constituting the lower face of the main wing 1.

The upper skin 3 and the lower skin 5 are made of, for example, a carbon fiber reinforced plastic (CFRP) that uses an epoxy-based resin as the base material and also uses carbon fiber as the reinforcement fiber. The upper skin 3 and the lower skin 5 may also be made of, for example, a metal such as an aluminum alloy.

As shown in FIGS. 1 and 2, the spars 7 are structural members extending in the span direction of the main wing 1 (the direction perpendicular to the plane of paper in FIG. 2), and are disposed so as to extend between the upper skin 3 and the lower skin 5.

In the present embodiment, a description will be given of an example in which the spars 7 are respectively disposed on the leading edge LE side and the trailing edge TE side of the main wing 1.

As shown in FIGS. 1 and 2, the stringers 11 are structural members extending between a pair of the spars 7 in the span direction of the main wing 1 (the direction perpendicular to the plane of paper in FIG. 2), and serve to aid the spars 7 in the strength.

The spars 7 and the stringers 11 serve to transmit, to the aircraft fuselage (not shown) to which the main wing 1 is attached, the bending and torsion forces exerted on the main wing 1 that act in the front-back direction and the up-down direction.

As shown in FIGS. 1 and 2, the ribs 9 are structural members extending in the chord direction of the main wing 1 (the right-left direction in FIG. 2) and disposed extending between the upper skin 3 and the lower skin 5. In other words, the ribs 9 are structural members extending in a direction substantially orthogonal to the spars 7 and the stringers 11, and are plate-like members shaped so as to have the cross sectional shape of the main wing 1.

The spars 7, the ribs 9, and the stringers 11 are made, for example, of a metal such as an aluminum alloy. Alternatively, they may be partly made of a metal, or may be entirely made of a fiber reinforced plastic such as CFRP.

The fuel tank 13 is a tank in which an aircraft fuel (combustible) is stored, and its storage space is formed by the interior of the main wing 1 partitioned by the upper skin 3, the lower skin 5, a pair of the spars 7 and a plurality of the ribs 9 as shown in FIGS. 1 and 2. The fuel tank 13 is an integral tank that is formed integrally with the main wing 1.

Installed in the interior of the fuel tank 13 are fuel pipes (omitted in the drawing) for receiving and supplying the fuel and the wiring (omitted in the drawing) for a fuel measurement system for measuring the fuel amount.

The spars 7, the stringers 11, and the ribs 9 are fastened to the upper skin 3 and the lower skin 5 with fasteners 15 made of a metal. The fasteners 15 may be made of, for example, an aluminum alloy or titanium.

Figure 3:
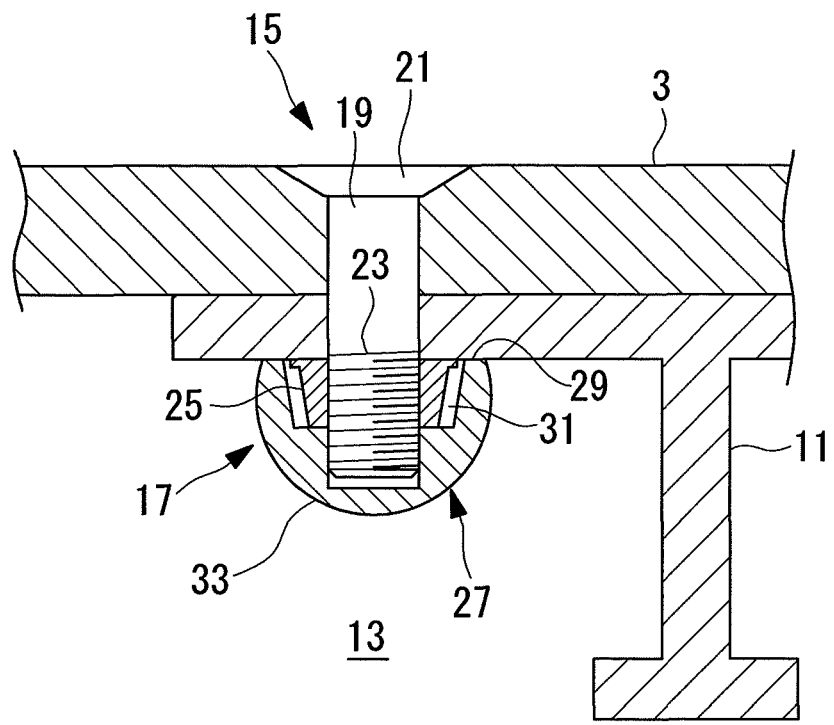
FIG. 3 is a cross-sectional view illustrating the configuration of a fastening structure between an upper skin and a stringer shown in FIG. 2.

FIG. 3 is a cross-sectional view illustrating the configuration of a fastening structure 17 between the upper skin 3 and a stringer 11 shown in FIG. 2.

A fastener 15 includes a cylindrically extending shank portion 19 and a head portion 21 disposed at one end of the shank portion 19.

The head portion 21 has the shape of a truncated cone. A small diameter portion of the head portion is configured to connect to the shank portion 19 having a diameter substantially the same as that of the small diameter portion of the head portion. An external thread 23 is engraved on the other end side (the side opposite from the head portion 21) of the shank portion 19.

The fastener 15 is disposed such that the shank portion 19 is inserted into a through-hole formed in the upper skin 3 and the stringer 11 and the head portion 21 is embedded in the upper skin 3.

The shank portion 19 is configured to project from the stringer 11 into the interior space of the fuel tank 13. The fastener 15 fastens the upper skin 3 and the stringer 11 by a nut 25 being threadably engaged with the external thread 23 of the shank portion 19 and being thus moved toward the stringers 11.

A cap 27 is provided that covers the portion of the fastener 15 that is located inside the fuel tank 13, or in other words, the portion projecting from the stringer 11 through the inside of the fuel tank 13, and the nut 25.

The cap 27 has the shape of a substantially spherical body that is cut by a plane. This section plane constitutes a contact surface 29 coming into contact with the stringer 11 serving as a structural member.

A housing space 31 for housing the portion of the fastener 15 that projects from the stringer 11 and the entirety of the nut 25 is formed at the central portion of the contact surface 29. The cap 27 is mounted in a state in which the housing space 31 houses the portion of the fastener 15 that projects from the stringer 11 and the entirety of the nut 25 and that the contact surface 29 is in contact with the stringer 11. In other words, the cap 27 is attached so as to cover the portion of the fastener 15 that projects through the stringer 11 and the entirety of the nut 25.

The outer surface 33 of the cap 27, excluding the contact surface 29, faces the interior space of the upper skin 3, or in other words, the interior space of the fuel tank 13. During mounting of the cap 27, the outer surface 33 comes into contact with the interior space of the upper skin 3. On the other hand, the contact surface 29 is in contact with the stringer 11, and thus will not come into contact with the interior space of the upper skin 3.

The outer surface 33 forms a part of a substantially spherical body, and therefore is a curved surface. The shape of the outer surface 33 is not limited to a part of a spherical body, and may be any suitable shape that constitutes a curved surface.

Although a corner is formed at the boundary between the contact surface 29 and the outer surface 33, this corner does not correspond to the outer surface 33 coming into contact with the interior space of the upper skin 3 because the contact surface 29 is in contact with the stringer 11.

The cap 27 is made of, for example, an aluminum alloy. The material forming the cap 27 is not limited to an aluminum alloy, and may be any suitable conductive material.

In this case, it is preferable, in inhibiting the occurrence of electrolytic corrosion, to use a material having an electrical resistance substantially equal to that of the materials of the fastener 15 and the stringer 11.

The cap 27 may also be attached by engraving an internal thread in the housing space 31 and threadably engaging the internal thread with the external thread 25 of the fastener 15 such that the contact surface 29 is in firm contact with the stringer 11.

When a gap is created between the contact surface 29 and the stringer 11, a conductive grease may be interposed between the contact surface 29 and the stringer 11 so as to ensure conductivity.

Alternatively, a sealant may be interposed between the contact surface 29 and the stringer 11 so as to achieve enhanced adhesiveness. In this case, for example, it is preferable to provide the contact surface 29 with a projection and firmly push the contact surface 29 so as to be embedded on the stringer 11 side, thus ensuring conductivity.

The fastening structure provided by the fastener 15 between the upper skin 3 and the lower skin 5, and the spars 7 and the ribs 9 includes the cap 27 described above.

An operation of the fastening structure 17 according to the present embodiment configured as described above will now be described.

When lightning strikes in the vicinity of the fastener 15, the stroke current flows through the fastener 15. The stroke current flowing through the fastener 15 flows from the fastener 15 to the stringer 11, while flowing from the fastener 15 through the interior of the cap 27 to the stringer 11 via the contact surface 29.

In this way, the stroke current flows from the fastener 15 through the interior of the cap 27 to the stringer 11, and it is therefore possible to inhibit concentration of the electric field at a corner of the fastener 15 located at this portion, for example, the distal end of the external thread 23 or the end of the fastener 15.

Since the outer surface 33 of the cap 27 is a curved surface, there is no corner. Accordingly, the outer surface 33 of the cap 27 does not have any portion where the electric field is concentrated, and it is therefore possible to inhibit the occurrence of sparks caused by electric field concentration.

Further, since the stroke current that has flown from the fastener 15 to the cap 27 flows through the contact surface 29 to the stringer 11, the area to which the current is transmitted is increased as compared with a structure only including a path in which the current flows from the fastener 15 directly to the stringer 11. Accordingly, the resistance of the current flowing from the fastener 15 to the stringer 11 is effectively lowered. When the resistance of the current flowing from the fastener 15 to the stringer 11 is lowered, the current value is decreased, and it is therefore possible to further inhibit the occurrence of sparks.

Accordingly, it is possible to sufficiently suppress the possibility of explosion due to ignition of the fuel caused by the occurrence of sparks in the interior of the fuel tank 13, thus enhancing the safety of the aircraft. Furthermore, since the lightning protection structure for the fastener 15 and the like can be made simple and more workable, it is possible to reduce the manufacturing costs.

It should be appreciated that the present invention is not limited to the embodiments described above, and various modification may be made without departing from the gist of the present invention.

For example, in the case where a wide contact surface 29 can be ensured and the resistance of the current flowing from the fastener 15 to the stringer 11 can be sufficiently lowered, the outer surface 33 may have a corner.

REFERENCE SIGNS LIST

1 Main wing
3 Upper skin
5 Lower skin
7 Spar
9 Rib
11 Stringer
15 Fastener
17 Fastening structure
27 Cap
29 Contact surface
33 Outer surface

The invention claimed is:

1. A cap that is attached so as to cover an entirety of a portion, of a fastener that couples a skin that separates an exterior space and an interior space of an aircraft and a structural member located in the interior space, the portion of the fastener projecting through the structural member,
    wherein the cap has a contact surface to be in contact with the structural member,
    a projection is provided on the contact surface, and the projection is to be in contact with the structural member so as to be embedded in the structural member, and
    the cap is made of a conductive material.

2. The cap according to claim 1, wherein the cap is electrically connected to the fastener.

3. The cap according to claim 1, wherein an outer surface of the cap that is to be in contact with the interior space is a spherical surface.

4. A fastening structure in which a skin of an aircraft and a structural member located inside the skin are coupled by a fastener,
    wherein a portion of the fastener that projects through the structural member is covered by the cap according to claim 1.

5. An aircraft in which a skin and a structural member located inside the skin are at least partly fastened by the fastening structure according to claim 4.

6. The fastening structure according to claim 4, wherein a sealant is interposed between the contact surface of the cap and the structural member.

7. The fastening structure according to claim 4, wherein an electrically conductive grease is interposed between the contact surface of the cap and the structural member.

8. A fastening structure in which a skin that separates an exterior space and an interior space of an aircraft and a structural member located in the interior space are coupled by a fastener, wherein:
    a cap is attached so as to cover an entirety of a portion of the fastener, the portion of the fastener projecting through the structural member;
    an outer surface of the cap that is to be in contact with the interior space is a spherical surface;
    the cap has a contact surface to be in contact with the structural member, and the cap is made of a conductive material; and
    an electrically conductive grease is interposed between the contact surface of the cap and the structural member.

9. The fastening structure according to claim 8, wherein the cap is electrically connected to the fastener.

10. The fastening structure accordingly to claim 8, wherein the cap threadedly engaged with the fastener.

11. An aircraft in which a skin and a structural member located inside the skin are at least partly fastened by the fastening structure according to claim 8.

12. A fastening structure in which a skin that separates an exterior space and an interior space of an aircraft and a structural member located in the interior space are coupled by a fastener, wherein:
    a cap is attached so as to cover an entirety of a portion of the fastener, the portion of the fastener projecting through the structural member;
    the cap has a contact surface to be in contact with the structural member, and the cap is made of a conductive material; and
    an electrically conductive grease is interposed between the contact surface of the cap and the structural member.

13. The fastening structure according to claim 12, wherein the cap is electrically connected to the fastener.

14. The fastening structure accordingly to claim 12, wherein the cap threadedly engaged with the fastener.

15. An aircraft in which a skin and a structural member located inside the skin are at least partly fastened by the fastening structure according to claim 12.

* * * * *